United States Patent [19]

Behrens

[11] Patent Number: 4,899,592
[45] Date of Patent: Feb. 13, 1990

[54] FLAT LINEAR FLOWMETER
[75] Inventor: Hugh C. Behrens, Angleton, Tex.
[73] Assignee: The Dow Chemical Company, Midland, Mich.
[21] Appl. No.: 741,939
[22] Filed: Jun. 6, 1985
[51] Int. Cl.$^4$ ............................................. G01F 1/58
[52] U.S. Cl. .............................................. 73/861.11
[58] Field of Search ...................... 73/861.11, 861.12; 310/11; 417/50; 324/204, 239, 240; 336/219

[56] References Cited

U.S. PATENT DOCUMENTS

| | | | |
|---|---|---|---|
| 2,390,863 | 12/1945 | Amidon et al. | 336/216 |
| 2,810,425 | 10/1957 | Heyman | 428/363 |
| 2,863,721 | 12/1958 | Endicott et al. | 252/378 R |
| 3,138,022 | 6/1964 | Mayer | 73/861.11 |
| 3,539,913 | 11/1970 | Prival | 324/204 |

FOREIGN PATENT DOCUMENTS 1157500  5/1958  France ............................. 73/861.11

Primary Examiner—Herbert Goldstein

[57] ABSTRACT

A device for measuring the flow of molten metal through a conduit using the principles involved in generating electricity. A pair of coil wound fingered core members are positioned about a flattened conduit. Each core member having an odd number of fingers. The odd numbered coils are connected in series to a current source and the even numbered coils are connected to an ammeter. Coil turns and core fingers laminations are separated by specially treated mica.

4 Claims, 2 Drawing Sheets

FLAT LINEAR FLOWMETER

CROSS REFERENCE TO RELATED APPLICATIONS

The invention described herein is related to my inventions described in the following commonly assigned patents, each of which was copending with this Application:

U.S. Pat. No. 4,828,459, "Annular Linear Induction Pump with an Externally Supported Duct", issued May 9, 1989 from Ser. No. 133,763 filed Dec. 16, 1987, which was a continuation of Ser. No. 900,200 filed Aug. 25, 1986, now abandoned, which was a division of Ser. No. 720,434 filed Apr. 5, 1985, now abandoned, U.S. Pat. No. 4,635,706, "Moeten Metal Handling System", issued Jan. 13, 1987 from Ser. No. 741,782 filed June 6, 1985, U.S. Pat. No. 4,688,431, "Annular Linear Induction Flowmeter", issued Aug. 25, 1989 from Ser. No. 743,442 filed June 11, 1985, and U.S. Pat. No. 4,633,930, "Molten Metal Shot Size and Delivery Mechanism for Continuous Casting Operations", issued Jan. 6, 1987 from Ser. No. 743,343 filed June 11, 1985.

BRIEF DESCRIPTION OF THE INVENTION

The flow meter of the present invention comprises a central tube, e.g. metal or ceramic, having a flat configuration through which a molten metal will flow. Positioned against the exterior flat surfaces of the tube are a pair of multi-fingered multi-laminate magnetic cores, each finger wound with a copper coil. The odd numbered coils are connected in series, to establish a field to obtain opposite magnetic polarities among the odd numbered core fingers. The intermediate even numbered coils are wired to transmit an induced current to a current measuring device, e.g. an ammeter. Each core and and the coils associated therewith are encased in a pair of non-magnetic housing elements matingly abuttable to the central portion of the tube. The coil windings are each electrically insulated from the other, preferably, with a special grade of high temperature mica. Similarily the several laminae of each core are electrically insulated from each other. The inner coil ends and inner winding surfaces are preferably electrically insulated from the tube.

In operation of the flowmeter of the present invention, a single phase alternating current is impressed across the windings of the odd numbered fingers which create a magnetic field internal of the central tube. When metal flows through the tube across this field there is generated in the intermediate winding an induced voltage which can be measured through an appropriate meter. There is a direct relationship between the volume of metal flowing and the current generated in the measuring circuit and thus there is obtained a convenient measure of the metal flowing through the central tube of the meter. The materials of construction and design for the flat flowmeter are (1) electrical insulation, preferably a specially treated mica which has been substantially freed of impurities identified as sooty deposits on the fingered magnetic core member, which were found to be released at high temperatures, e.g. about 1300° F. (ca., 700° C.); (2) windings, Invar and the like, but, preferably deoxygenated copper; (3) central tube in contact with the molten metal, a non magnetic metal, e.g. when measuring magnesium, it is preferably 347 stainless steel which is a columbium (also known as niobium) stabilized nickel alloy.

It was discovered that conventional electrical grade mica, when subjected to the high temperatures encountered in pumping magnesium, released impurities of unknown indentification evidenced as sooty deposits on the internal elements within the sealed housing when the internals were padded with argon. Conventional mica sheets produced for electrical insulation and which have not been treated as hereinafter described released the impurities beginning, at temperatures above about 400° C. and were found to be the primary cause of the shorting of the windings and/or laminated cores. Therefore a special grade of mica is required. Thus, the test for acceptable mica is to heat the mica under an argon atmosphere while at the operating temperature to determine whether any visible sooty deposit forms under these conditions. If a deposit forms then the mica must be subjected to the treatment aforedescribed and retested until no sooty deposit is visible.

It has now been found (as more fully described in my copending application Ser. No. 720,434, filed April 5, 1985, entitled "Annular Linear Induction Pump with Externally Supported Duct", which is incorporated in toto herein (the teachings of which have subsequently issued in U.S. Pat. No. 4,828,459), that if conventional commercially available mica, for example in sheet form, the usual form of mica employed to insulate transformer laminations as well as electrical resistance applications, is heated to above 500° C. (932° F.), and preferably above 700° C. (1300° F.) and most preferably above 850° C. under an oxidizing atmosphere, e.g. air, for a period of from 1 to 24 hours and preferably in excess of eight hours, the so treated mica will withstand the rigors of high temperature (above 500° C. (932° F.) and preferably above 1300° F., (700° C.) respectively, under an argon atmosphere) without producing a shorting condition. Conventional mica used as a laminate insulation and the coil winding insulation, even when padded with argon, when placed in magnesium service resulted in a black soot forming on the mica surface, whereas mica which had been treated in accordance with the present invention and similarly employed in an argon padded atmosphere showed no visible evidence of such sooty formation. In every instance where untreated mica was employed as the insulation in a pump used in magnesium service shorting of the coils occurred, in many instances on pre-use tests and/or shortly after immersion into the molten material.

With respect to the metal components of the fingered core, similar to the mica, temperature is a major consideration and if cooling is not employed, and, preferably it is not, cobalt alloys are the metal of choice because the Curie Point is not exceeded at operating temperatures in the range up to 1500° F. The windings of the coils are preferably flat deoxygenated copper tape or strips, although round copper wire may be employed, but is not the shape of choice. In a preferred embodiment a housing containing each of the coils is padded with argon or other inert nonoxidizing gas.

DETAILED DESCRIPTION OF THE INVENTION

Figure 1:
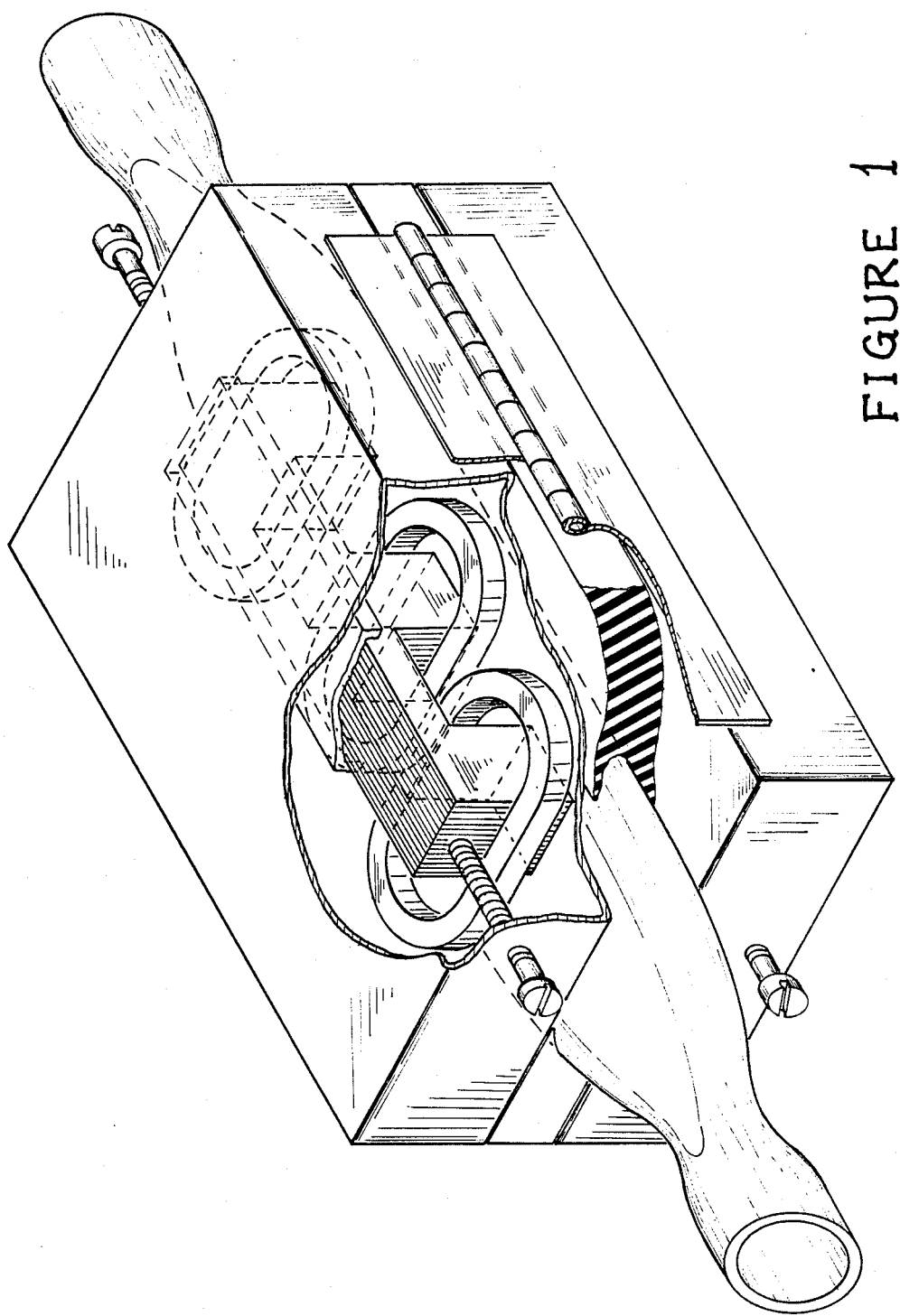
Figure 2:
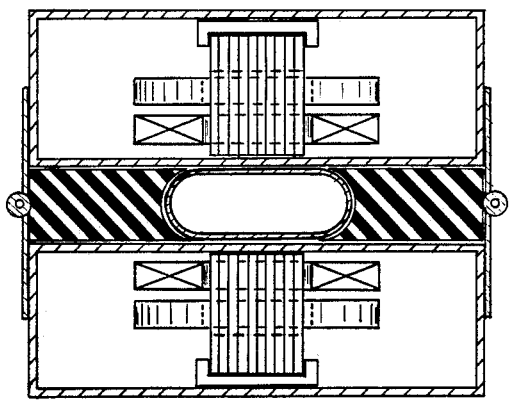
Figure 3:
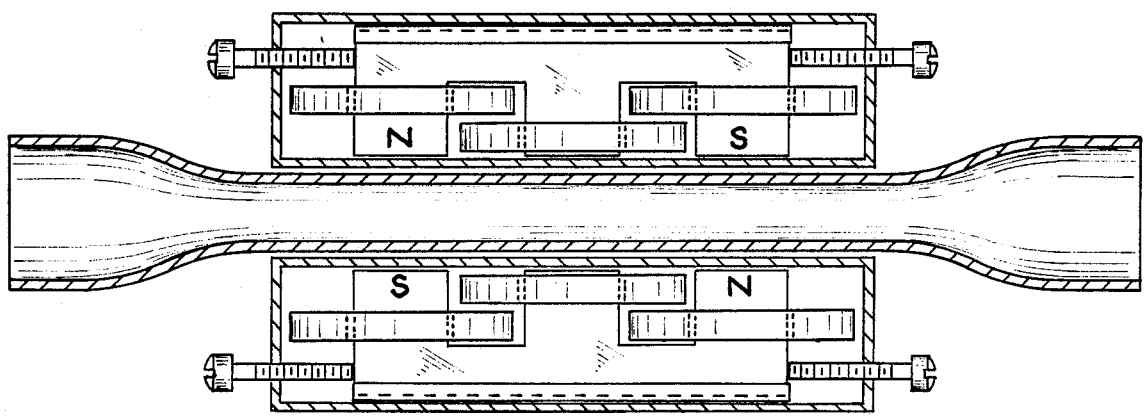

FIG. 1 represents in partial section the flow meter of the present invention;
FIG. 2 represents an end view of such a meter, and,
FIG. 3 represents a side view of such a meter.

In accordance with the present invention a flat linear flowmeter is constructed by locating a pair of laminated magnetic core members each having spaced paired powered winding and alternate intermediate windings, on opposite sides of a flattened section of a tube through which molten metal will flow, for example, a 1 ¾" OD SS 347 stainless steel tube 10 inches in length flattened in its central portion. One laminated fingered core member was positioned against the flat surface on each side of the flattened tube. Each of the pairs of laminates was encased in a pair of mating non-magnetic sealed housing members preferably designed with hinges on each side to matingly engage the hinge of the other housing to enable the pair of housings to be positioned on opposite sides of the flattened tube and be removably yet fixedly positioned about said tube when in service using the hinge pin of each hinge as the securing element. It is preferable that the sealed housing containing the laminates and their windings be padded with an inert non-oxidizing gas, such as argon. The core members are slidably mounted within the housing in guide clips within their, respective housing, being held in endwise adjustable position by a pair of screws at each end of each laminate.

Each finger of each laminate had one or more flat oxygenated copper windings coils wound with a mica strip between each layer of the winding wound about the fingers. Each fingered member also had a mica strip between each lamination.

It is convenient to operate at 60 Hz., although other current frequencies may be used.

The housing, made of any non magnetic material, preferably 300 series SS(stainless steel), which can withstand the operating temperatures, and the laminated core members are preferably a cobalt alloy.

In a representative example a three fingered core, as represented in FIG. 1, the outside, 1st and 3rd, coils were connected in series, one coil, e.g. coil 1, being connected to a power source at its outer most winding end, the inner most end being connected to the inner most end of the other outer coil, e.g. coil 3, and the outermost end of this coil completing the circuit to the power source. The intermediate coil, coil 2, is connected to an ammeter thereby to measure the induced current generated when power is supplied to the outer coils and metal is flowed through the tube.

It is preferable to provide a mica insulator at the laminates housing interface.

The flowmeter is preferably operated in the following manner.

The driving coils, the first and third coils, or pair of coils, on the first and third fingers are wound to give alternating opposite magnetic polarities and energized from a single phase, 8-16 volt source for example. The center coil, or intermediate coils, of each laminate is connected to an ammeter to sustain a direct short of the winding. (When more than three fingers are employed the intermediate coils may be connected in parallel.) The ammeter is calibrated for metal flow in the tube by operating at various flows and measuring the metal flowing by weight, reading the ammeter for each flow and establishing the relationship between the reading and the flow.

I claim:

1. An electromagnetic flowmeter for use in measuring the flow of molten metal, said metal melting above about 500° C. and having inducible electromagnetic properties, said flowmeter having no cooling associated therewith, which comprises:

a nonmagnetic tubular member flattened in its central portion having arranged about its flattened external surfaces a pair of cobalt alloy electromagnetic core members each being comprised of a multiplicity of fingered laminates having an odd number of fingers, which odd number is at least three, the laminates electrically insulated from each other by a mica which as been heated to above about 500° C. (932° F.) in the presence of an oxidizing gas for from about 1 to 24 hours until substantially free of sooty formation visible when heated to 500° C. (932° F.) in an argon atmosphere and assembled into a single member, an electric current carrying flat deoxygenated copper coil of windings about the finger of each electromagnetic core member which coil is likewise insulated between windings with said mica, an exterior housing encompassing each of the wound laminated core members and coils from the environment, a wire in electrical contact with the copper coils about the odd numbered fingers of the core sealably extending through such housing for connection to a single phase alternating current source, a pair of low resistance electrical current carrying wires connecting the coil(s) on the even numbered finger(s) with a current measuring device, the odd numbered coils being wound in a manner to produce a magnetic field across the path of the molten metal and a flux perpendicular to the flow path of the molten metal when a stream of the molten metal is within the tubular member while the coils are energized from the single phase alternating current source, and the even numbered coil(s) having a sensitive axis which detects the flux formed by the induced current loop formed in the flowing metal and forms an output signal related to the induced current loop as modified by the flow rate of the molten metal.

2. A device for measuring the flow of a molten metal, melting at more than 500° C., in a conduit, which device has no cooling associated with it, which comprises a non-magnetic tubular conduit flattened at its mid section;

a pair of core elements consisting of a multiplicity of laminations having an odd number of at least three fingers each having an electric current carrying flat coil of multiple turns of flat copper wound around each of the fingers, wherein both (i) the laminae of each core element and (ii) the windings of each coil are separated by a mica which has been heated to above about 500° C. (932° F.) in the presence of an oxidizing gas for from about 1 to about 24 hours until substantially free of sooty formation visible when heated to 500° C. (932° F.) in an argon atmosphere, the pair of core elements being positioned opposite each other against the flattened section of the exterior surface of the conduit;

the even numbered coils connected to an ammeter;

the odd numbered coils connected in series to a single phase alternating power source;

the coils and their multi-fingered core laminations encompassed in a housing sealed to the flattened conduit exterior surface.

3. The device of claim 2 wherein the mica is a mica which has been heated to above about 700° C. (1300° F.) in the presence of an oxidizing gas for from 1 to 24 hours until substantially free of sooty formation visible when heated to 700° C. (1300° F.) in an argon atmosphere.

4. A device for measuring the flow of a molten metal, melting at more than 500° C., in a conduit, which device has no cooling associated with it, which comprises a non-magnetic tubular conduit for the molten metal, which conduit has a midsection with a first flat exterior surface and a second flat exterior surface on the side of the midsection opposite the first flat exterior surface;

a pair of electromagnetic core elements consisting of a multiplicity of laminations having an odd number of at least three fingers each having an electric current carrying flat coil of multiple turns of copper wound around each of the fingers, wherein both (i) the laminae of each core element are electrically insulated from each other and (ii) the windings of each coil are are electrically insulated from each other, by a mica which has been heated to above about 500° C. (932° F.) in the presence of an oxidizing gas for from about 1 to about 24 hours until substantially free of sooty formation visible when heated to 500° C. (932° F.) in an argon atmosphere, the pair of core elements being positioned opposite each other against the flattened section of the exterior surface of the conduit;

first and second mating non-magnetic housings, each sealed about one of the core elements and the coils around the fingers of said core element, each housing containing an inert non-oxidizing atmosphere and electrically insulated from the core element and coils within by an insulator of said mica;

the even numbered coils connected to an ammeter;

the odd numbered coils wired for connection in series to a single phase alternating power source; and the first housing being positioned on the first flat exterior surface of the conduit midsection and the second housing being positioned on the second flat exterior surface of the conduit midsection so that the fingers of the core element within the first housing are positioned opposite to and in alignment with the fingers of the core element within the second housing.

* * * * *